2,242,486

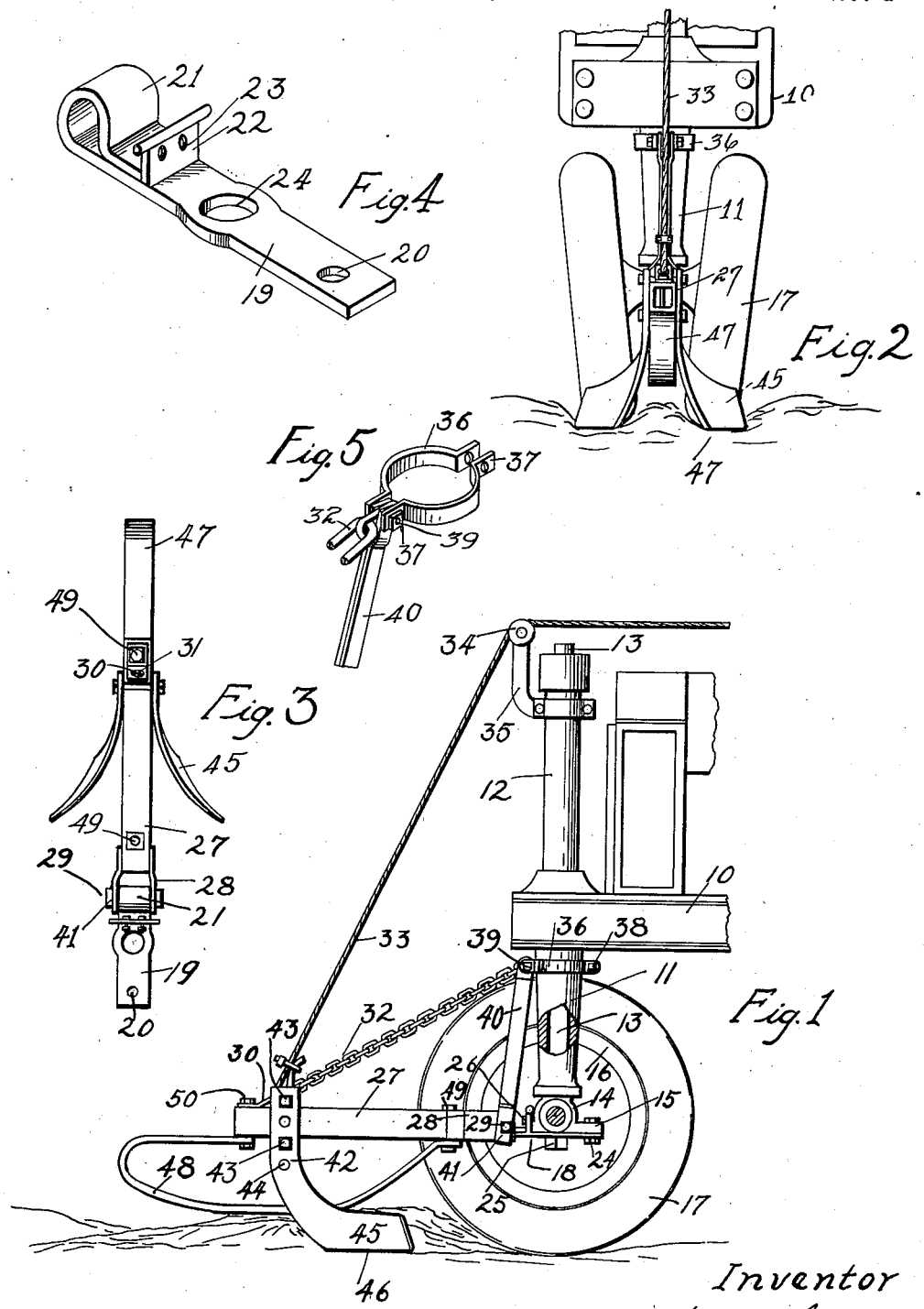

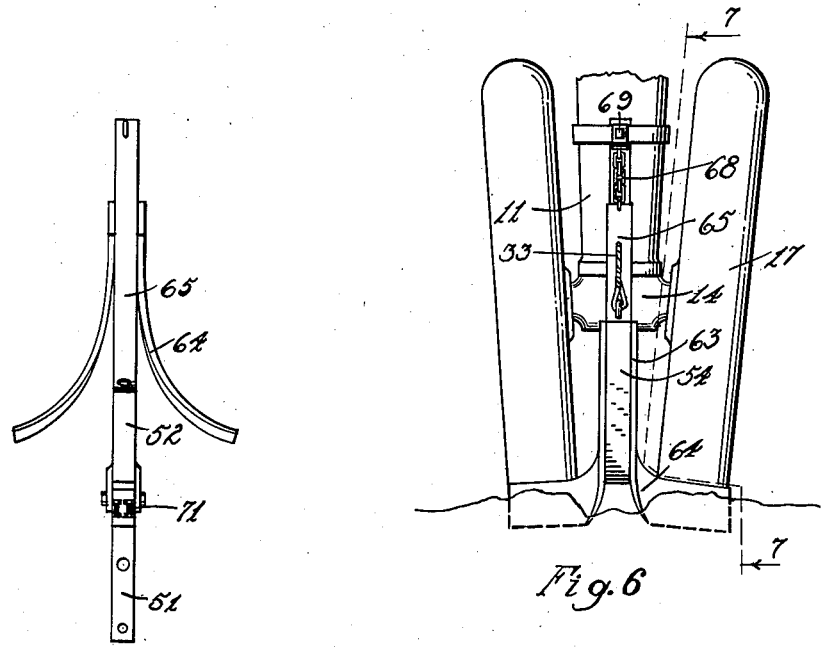
Fig. 6
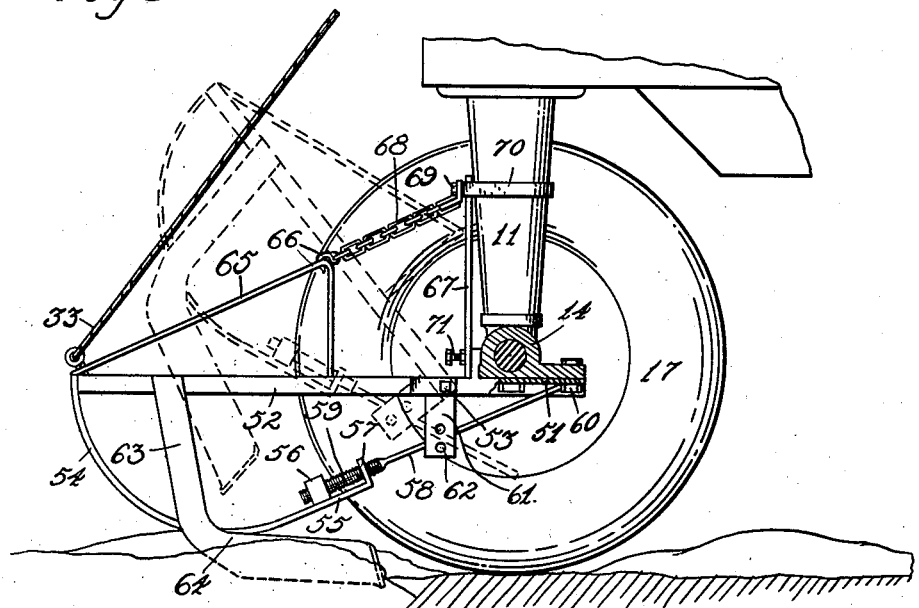
Fig. 8
Fig. 7
Inventor.
Andrew E. Sutherland
by Orwig & Hague Attys Patented May 20, 1941

UNITED STATES PATENT OFFICE 2,242,486

TRACK LEVELER FOR TRACTORS

Andrew E. Sutherland, Madrid, Iowa

Application May 11, 1940, Serial No. 334,545

8 Claims. (Cl. 97—47)

This invention relates to improvements in an attachment for tractors of the type usually used on the farm for cultivating growing plants, such as corn, cotton, etc. This type of tractor is usually equipped with two steering wheels having pneumatic tires arranged close together so as to pass between adjacent rows of plants. This type of steering wheel operates very efficiently except when crossing hilled rows, at which time an objectionable bouncing of the front end of the tractor takes place, more so than has heretofore been experienced with the solid steering wheels. This bouncing effect is greatly increased with the modern tractor, due to the fact that it travels a great deal faster than is possible with the older types. For that reason the bouncing effect is very disagreeable and uncomfortable to the operator.

It is, therefore, the object of my invention to provide means of simple construction which may be easily and quickly attached to the front steering axle and to be guided with the wheels and adapted to travel ahead of the wheels for forming grooves for leveling the track over which the wheels travel, to eliminate the undesirable bouncing effect. More specifically, it is the object of my invention to provide a detachable bracket which may be secured to the steering axle and arranged to support a forwardly extending arm pivotally mounted to the bracket in such a manner that the forward end of the said arm may be elevated and lowered, and to mount on the forward end of said arm suitable earth-leveling tools or cutters, and so arranged that trash or other substances engaged by the tools will readily free themselves of the cutters or tools, and in connection therewith, means carried by the tractor frame for gauging the depth of the tools so that they will engage only the ridges or high points of the ground surface.

A further object of my invention is to provide in connection with a leveling device of the type above described, improved means for preventing the tool from gouging into the ground surface and turning downwardly and rearwardly to engage the tires of the steering wheels in case the depth-gauging means should accidentally become broken.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of the front end of a tractor showing one of the steering wheels removed, and the manner in which my improved earth-leveling device is attached thereto.

Figure 2 is a front elevation of the same.

Figure 3 is a top view of my improved earth-leveling device with the depth regulating chain and the elevating cable removed.

Figure 4 is an isometrical view of the supporting bracket adapted to be secured to the tractor axle.

Figure 5 is a perspective view of the clamp device for securing the depth-regulating chain to the tractor wheel supporting post, together with a portion of the brace for holding said clamp in position.

Figure 6 is a front elevation of a modified form of my device showing the manner in which it is applied to the front axle of a tractor.

Figure 7 is a detail sectional view taken on the line 7—7 of Figure 6.

Figure 8 is a plan view of the modified form of track leveler.

Referring to the accompanying drawings, the numeral 10 indicates the tractor frame having a downwardly extending steering post 11 and an upwardly extending post 12. Both of the posts 11 and 12 are adapted to rotatably receive a steering shaft 13 having at its lower end a head 14 for receiving an axle 15, each end of which is provided with a steering wheel 16 and each having a pneumatic tire 17.

Fixed to the under side of the head 14 I have provided a bracket 18 comprising a bar 19 having an opening 20 in one end and its opposite end formed into a loop 21, the loop portion terminating in an upwardly extending flange 22 having screw-threaded openings 2. The central portion of the bar 19 is provided with a large opening 24a. The bar 19 is adapted to be placed adjacent to the under surface of the head 14 with a bolt 24 extending through the opening 20 into said head. A large bolt 25 is also provided for entering the opening 24a for firmly anchoring the bar to the under side of the head 14. The openings 23 are adapted to receive set screws 26 for engaging the front side of the head 14 and to further assist in holding the bar in position and relieve the bolts 24 and 25 of shearing strains, as well as some of the downward strains imparted to the forward end of the member 19.

My improved leveler comprises an arm 27 having at one end a pair of spaced and rearwardly extending plates 28 adapted to receive between them the loop portion 21 of the bar 19, said bars being pivotally mounted therein by means of a bolt 29. The opposite end of the arm 27 is provided with a plate 30 having an opening 31 for receiving one end of a chain 32 and also one end of a cable 33, the other end of the cable being passed over a pulley 34 carried by the bracket 35 secured to the upper end of the post 12. The cable 33 has its free end attached to any suitable hand-controlled device whereby the free end of the arm 27 may be elevated and lowered at the will of the operator. The opposite end of the chain 32 is connected to a clamp device 36 comprising a pair of semi-circular bars having laterally extending flanges 37 at their ends for receiving bolts 38 and 39, by means of which the said clamp may be secured to the upper end of the post 11, or, if so desired, the lower end of the post 12, the chain 32 being attached to said clamp by means of the bolt 39, in the manner clearly illustrated in Figure 5.

To assist in holding the clamp 36 in position on the post 11 I have provided a brace 40 having its upper end bifurcated, and also provided with holes for receiving the bolt 39, the lower end of the brace being provided with spaced flanges 41 adapted to be mounted on each side of the plates 28 and for receiving the bolt 29, thus providing means for fixably holding the clamp 36 in position on the post 11, the front end of the arm 27 being adapted to receive a pair of shanks 42 detachably and adjustably secured thereto by means of bolts 43, through openings 44 formed in said shanks. The lower end of the shanks are bent downwardly and rearwardly and terminating in diverging and rearwardly extending blades or scrapers 45, said blades having their lower edges 46 adapted to move substantially in a horizontal plane and to provide a cutting edge, the blades 45 also being inclined rearwardly and upwardly from said cutting edge, each of said blades being supported and formed in such a manner as to travel substantially in front of its corresponding wheel 16, and so arranged that the blades will engage the transverse ridges and scrape furrows 47 in the said ridges in the manner substantially as illustrated in Figure 2, the bottom edges of the furrows being substantially even with the bottom of the cross furrows so that wheels will travel on comparatively smooth tracks and thus eliminate the undesirable bouncing of the front end of the tractor.

The chain 32 is so adjusted as to provide means for gauging the depth of the tools 45, and inasmuch as the chain is carried by the tractor frame or the post 11 and the wheel 17 is travelling on a smooth path, then it will be seen that the lower edges of the blades 45 will be guided to travel in a line substantially parallel with the ground surface, and not be affected by the ridges and furrows of the hilled rows, the lower edge of the cutter being carried above the bottoms of the troughs of the ridges when properly adjusted, so that the blades only engage the ridges or hills. It will readily be seen that inasmuch as the cutting edges of the blades 45 are below the pivot member 29, the tendency of the blade is to be drawn into the ground by suction, the chain 32 providing means for supporting the forward end of the arm against this tendency of the arm to move downwardly when the blades engage the hills or ridges.

In order to prevent the free end of the arm 27 from turning downwardly and under the tires 17 I have provided on the under side of the said arm a runner 48 having one end attached to the forward end of the arm by means of a bolt 50, which also serves to hold the member 30 in position. The forward end of the runner 48 may be placed on top of the arm 27 instead of beneath it, as illustrated in the drawings, to thereby adjust the depth of said runner. The depth of the blades 45 may be adjusted by means of the bolts 43 and the openings 44.

In Figures 6, 7 and 8 I have illustrated a modified form of my device in which the bracket 51 is similar to the bracket 19 which is provided with an arm 52 pivoted to said bracket by means of a pivot 53, the free end of the arm 52 being provided with a runner 54 having one end fixed to the forward end of the arm 52 and its other end inclined upwardly and rearwardly to form a portion 55 to which a nut 56 is secured, the rear end of the member 55 being bent upwardly to form a portion 57 having an opening through which a threaded bar 58 extends, the forward end of the bar 58 having a threaded portion 59 mounted in the nut 56, said bar 58 being flattened so that a wrench may be applied thereto for adjusting the portion 59 and the nut 56, thereby providing means for increasing or decreasing the length of the bar, the free end of which is adapted to be mounted in front of the bolt head 60 which serves to hold the bracket 51 to the axle 14. By this arrangement the bar 58 serves as a brace to support the forward end of the arm 52 against downward movement, and yet so arranged that the forward end of the bar may be elevated when so desired. The rear end of the arm 52 is provided with downwardly extending bars 61 for receiving the bar 58 between them, said bar 61 having pins 62 above and below the bar 58 to serve as a guide for the free end of the bar 58. Near the forward end of the arm 52 is a pair of downwardly extending shanks 63 having their upper ends welded to said arm and the lower ends welded to the shoe 54, the lower ends of the shanks terminating in rearwardly and laterally extending blades 64, the said blades being curved outwardly from each other in the manner clearly illustrated in Figure 8.

The outer ends of the blades are inclined upwardly and forwardly from their cutting edges so as to reduce the suction of the blade and to permit the blade to slide upwardly and over solid obstructions such as stones or hard earth, and to thereby reduce the gouging effect that would be produced by a blade in having its forward face inclined upwardly and rearwardly.

Supported on the upper face of the forward end of the arm 52 I have provided a bracket 65 having a shoulder 66 adapted to engage the upwardly extending bar 67 when the arm is elevated to the dotted line position as shown in Fig. 7, and to thus prevent the corners of the blades from engaging the periphery of the tires 17. A chain 68 is provided, one end of which is connected to the shoulder 66 and the other to a bolt 69 carried by a collar 70 surrounding the post 11. The collar 70 also serves to support the upper end of the bar 67, the lower end of which is connected to the bracket 60 by means of bolts 71, the said bars 67 serving to assist in anchoring the bracket 61 to the axle 14, the cable 33 being provided for elevating the forward end of the arm 52.

In my modified form the shanks 63 are permanently fixed to the arm 62 and the shoe 54, thus providing means for greatly strengthening the shoe and at the same time providing means for bracing the shanks by means of the shoe, the shoe serving to gauge the depth of the blades at such times as when the device is being operated across ditches or ravines, at which time the chain 68 will permit the bar to be elevated to prevent the cutters gouging into the earth's surface. The adjustable brace 58 provides means whereby the depth of the blades may be varied.

I claim as my invention:

1. The combination of a tractor frame, including a steering axle, steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a pair of vertically arranged shanks supported on opposite sides of said arm, said shanks having their lower ends curved rearwardly and downwardly and terminating in rearwardly diverging earth-leveling blades having their lower and cutting edges adapted to travel in substantially a horizontal plane, said blades also being inclined upwardly and rearwardly from said cutting edge, each of said blades being supported in front of its corresponding tractor wheel whereby leveled paths will be formed in ridges extending transversely of the line of advance of said tractor for said wheels as the tractor is advanced.

2. The combination of a tractor frame, including a steering axle, steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a pair of vertically arranged shanks supported on opposite sides of said arm, said shanks having their lower ends curved rearwardly and downwardly and terminating in rearwardly diverging earth-leveling blades having their lower and cutting edges adapted to travel in substantially a horizontal plane, said blades also being inclined upwardly and rearwardly from said cutting edge, each of said blades being supported in front of its corresponding tractor wheel, and a runner carried by said arm between said shanks for preventing the blades from gouging the ground surface in case said arm-supporting means becomes accidentally released or broken.

3. The combination of a tractor frame, including a steering axle, steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a pair of vertically arranged shanks supported on opposite sides of said arm, said shanks having their lower ends curved rearwardly and downwardly and terminating in rearwardly diverging earth-leveling blades having their lower and cutting edges adapted to travel in substantially a horizontal plane, said blades also being inclined upwardly and rearwardly from said cutting edge, a chain having one end secured to the free end of said arm, means for clamping the other end of said chain to the tractor frame, a brace extending upwardly from the pivoted end of said arm to said clamping means, and means for raising and lowering the free end of said arm.

4. In a device of the class described, an arm, a bracket adapted to detachably secure said arm to the bottom side of the steering axle of a tractor, means pivotally connecting said arm to said bracket, a chain having one end attached to the forward end of said arm and the other attached to a tractor frame for supporting the arm in a horizontal position, a pair of downwardly and rearwardly extending shanks having their lower ends terminating in outwardly and rearwardly diverging blades, means for adjustably connecting said shanks to said arm, and a cable attached to said arm for elevating the arm from a substantially horizontal position to an upwardly and forwardly inclined position.

5. In a device of the class described, an arm, a bracket pivotally connected thereto and adapted to be connected to the bottom side of the steering axle of a tractor to support the arm in a horizontal position and extended forwardly from said axle, a pair of downwardly extending shanks attached to said arm and having their lower ends terminating in outwardly and rearwardly diverging blades, a runner extending downwardly and rearwardly from the forward end of said arm and between the lower ends of said shanks and secured thereto, terminating in an upwardly and rearwardly inclined portion, a brace adjustably mounted longitudinally on said inclined portion, and means carried by the under surface of said bracket for engagement with the free end of said brace to limit the downward movement of the runner and cutter.

6. In a device of the class described, an arm, a bracket pivotally connected thereto and adapted to be connected to the bottom side of the steering axle of a tractor, an upright bar secured to the forward end of said bracket, means for detachably fixing the upper end of said bracket to the steering post of a tractor, a second bracket carried by the upper face of the forward end of said arm, a chain having one end connected to the upper end of said upright bar and the other end connected to the upper end of said second bracket to support the arm in a horizontal position, and extending forwardly from said axle, a pair of downwardly extending shanks attached to said arm and having their lower ends terminating in outwardly and rearwardly diverging blades, a runner extending downwardly and rearwardly from the forward end of said arm and between the lower ends of said shanks and secured thereto, terminating in an upwardly and rearwardly inclined portion, a brace adjustably mounted longitudinally on said inclined portion, and means carried by the under surface of said bracket for engagement with the free end of said brace to limit the downward movement of said runner and cutters.

7. The combination of a tractor frame, including a steering axle, a steering wheel therefor, a bracket detachably secured to the center of said axle, an arm having one end pivoted to said bracket and its free end extending forwardly thereof to swing upwardly and downwardly, flexible means carried by the tractor frame for limiting the downward movement of the free end of said arm, a vertically arranged shank fixed to said arm, its lower end being provided with a blade supported ahead of said wheel to move dirt laterally as the tractor is advanced, to form a level path for said wheel, and means for limiting the upward movement of said arm to prevent the blade from piercing the tire of said wheel.

8. In a device of the class described, a bracket adapted to be secured to the under surface of a tractor axle, an arm having one end pivoted to said bracket, flexible means supporting said arm in a substantially horizontal position, and a shaft depending from said arm having on its lower end a laterally and rearwardly extending blade to move material laterally as the tractor is advanced, the blade being inclined upwardly and forwardly from its cutting edge, for the purpose stated.

ANDREW E. SUTHERLAND.